(12) United States Patent
Jarrar et al.

(10) Patent No.: US 9,438,242 B2
(45) Date of Patent: Sep. 6, 2016

(54) SYSTEMS AND METHODS FOR REDUCING POWER CONSUMPTION IN SEMICONDUCTOR DEVICES

(71) Applicants: Anis M. Jarrar, Austin, TX (US); Mark D. Hall, Austin, TX (US); David R. Tipple, Leander, TX (US); Surya Veeraraghavan, Austin, TX (US)

(72) Inventors: Anis M. Jarrar, Austin, TX (US); Mark D. Hall, Austin, TX (US); David R. Tipple, Leander, TX (US); Surya Veeraraghavan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 726 days.

(21) Appl. No.: 13/940,644

(22) Filed: Jul. 12, 2013

(65) Prior Publication Data

US 2015/0015306 A1 Jan. 15, 2015

(51) Int. Cl.
*G06F 17/50* (2006.01)
*H03K 19/094* (2006.01)

(52) U.S. Cl.
CPC ......... *H03K 19/094* (2013.01); *G06F 17/5068* (2013.01); *G06F 2217/84* (2013.01)

(58) Field of Classification Search
CPC ................ G06F 17/5068; G06F 17/5045
USPC ........................................ 716/113
See application file for complete search history.

(56) References Cited

U.S. PATENT DOCUMENTS

| | | | |
|---|---|---|---|
| 7,366,997 B1 * | 4/2008 | Rahmat | G06F 17/5036 716/111 |
| 7,895,548 B2 | 2/2011 | Lin et al. | |
| 8,234,605 B2 | 7/2012 | Penzes | |
| 8,350,365 B1 | 1/2013 | Wu et al. | |
| 2010/0169847 A1 * | 7/2010 | Gupta | G06F 17/5063 716/122 |
| 2011/0093830 A1 * | 4/2011 | Chen | G06F 17/5045 716/132 |
| 2012/0210284 A1 | 8/2012 | Datta et al. | |
| 2013/0125077 A1 * | 5/2013 | Rozen | G06F 17/505 716/119 |

FOREIGN PATENT DOCUMENTS

JP 2011129550 6/2011

* cited by examiner

*Primary Examiner* — Don Le

(57) ABSTRACT

A method of making a first timing path includes developing a first design of the first timing path with a first logic circuit and a first functional cell, wherein the first functional cell comprises a first transistor that is spaced from a first well boundary. The timing path is analyzed to determine if the first timing path has positive timing slack. If the analyzed speed of operation shows positive timing slack, the design is changed to a modified design to reduce power consumption of the first timing path by moving the first transistor closer to the first well boundary. Also the first timing path is then built using the modified design to reduce power consumption of the first timing path by reducing leakage power consumption of the first transistor.

20 Claims, 4 Drawing Sheets

SYSTEMS AND METHODS FOR REDUCING POWER CONSUMPTION IN SEMICONDUCTOR DEVICES

BACKGROUND

1. Field

This disclosure relates generally to semiconductor devices, and more specifically, to reducing power consumption in semiconductor devices.

2. Related Art

Semiconductor integrated circuit chips (ICs) generally include a semiconductor substrate supporting various types of circuits such as random access memory (RAM), arithmetic logic units (ALUs), multiplexers (MUXs), and addressable registers, interconnected by various data signal paths. These circuits are typically formed of various lower level logic circuits, or "cells," such as NAND gates, NOR gates, inverter gates, and various types of latches and flip-flops. The cells are typically interconnected such that the output of each connects, through respective signal paths, to inputs of other cells. Currently available large scale ICs can include millions of these cells, with each cell containing PMOS and NMOS transistors.

To save time during the design process, circuit representations of the lower level logic circuits can be included in libraries of standard cells that are accessible to circuit designers using interactive design workstations. The more complex circuits are designed using the standard cells as building blocks.

NMOS transistors are built using a well doped with P-type material in a substrate, and PMOS transistors are built using a well doped with N-type material in the substrate. Well proximity effects refer to NMOS or PMOS transistors located close to an edge of a respective well exhibiting different threshold voltage and drive current than devices located farther from the edge of the well. An integrated circuit composed of one or more various types of logic circuits requires a finite amount of time for a signal to propagate from the input to the output of the circuit. Circuits composed of NMOS and PMOS transistors with a low threshold voltage exhibit fast response but have correspondingly high leakage. To reduce power consumption due to leakage current, the threshold voltage can be raised, with an attendant decrease in the operating speed of the device.

The circuits typically have a fixed amount of time to operate to meet timing requirements. At low clock rates, there is typically no difficulty in arranging the circuits to ensure that timing requirements are met. Meeting the timing requirements becomes more challenging, though, as clock frequencies become higher. Additionally, as the number of devices in integrated circuits increases, it is desirable to conserve power wherever possible. Thus, the higher speed and attendant higher leakage current to meet timing requirements conflicts with efforts to conserve power.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of devices and methods are disclosed for integrated circuits that meet timing requirements while taking advantage of well proximity effects to vary the location of transistor elements in library cells. Transistors closer to the edge of a well will have slower response and lower leakage current, while transistors located farther from the edge will have faster response and higher leakage current. The location of at least some of the transistors can be moved closer to the edge of the well until most of the available slack time allocated for a particular timing path is consumed. Adjusting the location of the transistors closer to the edge of the well increases the threshold voltage while decreasing leakage of the transistors, thus enabling the circuits to meet timing requirements while still reducing power consumption. Further, a library of standard cells having transistors that perform the same function as another cell with one or more of the components in a different location can be developed and used by designers to improve power consumption at any phase of circuit design without requiring changes in the footprint of the cell or in metal layer routing of the layout. In the post route phase of the design, the cell swap out can occur without modifying existing routing in the integrated circuit.

Figure 1:
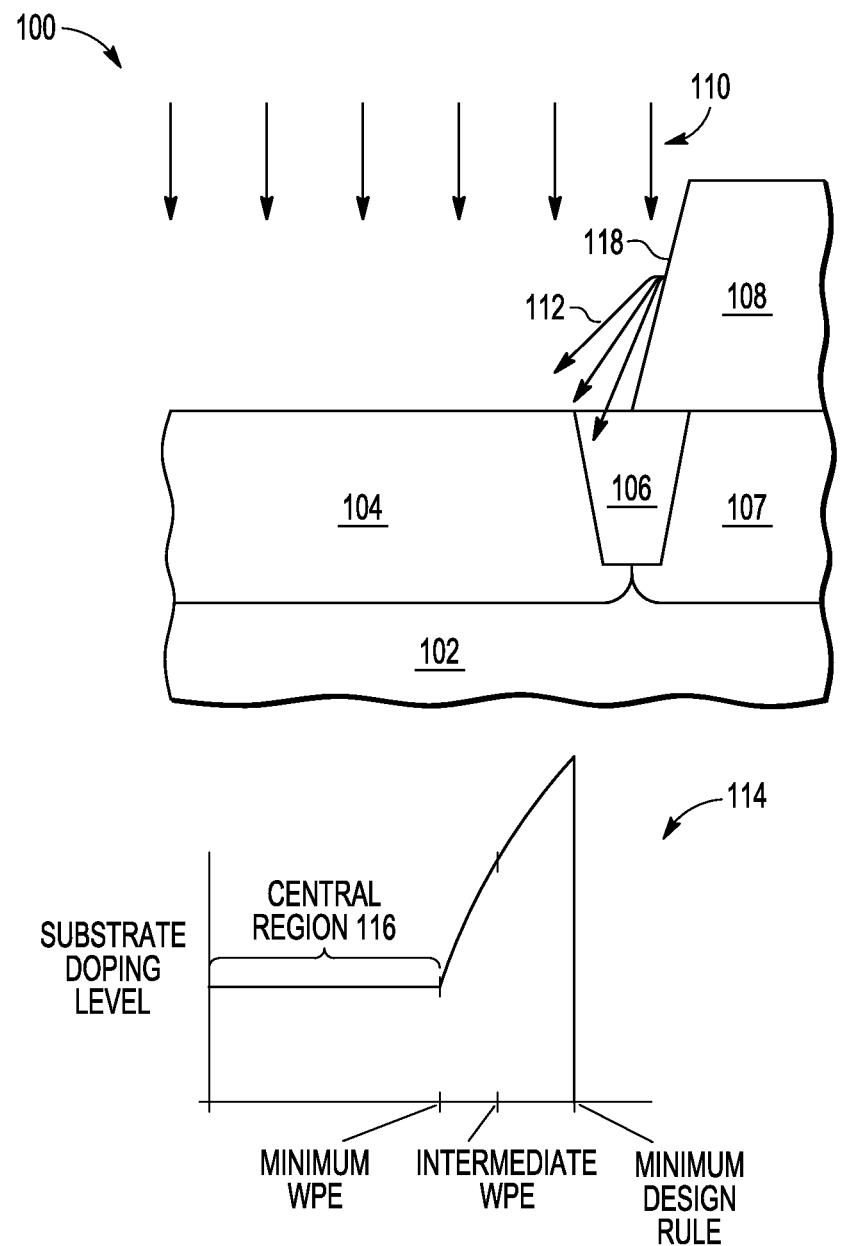
FIG. 1 illustrates an embodiment of a portion of an integrated circuit device including a substrate with higher doping levels at the edge of a well than at the central region of the well.

FIG. 1 illustrates an embodiment of a portion of integrated circuit device 100 including a substrate 102 with higher doping levels at the edge of a well 104 than at the central region 116 of well 104. In addition to well 104, device 100 includes an isolation trench 106 separating well 104 from another well 107. Photoresist 108 is placed over well 107 while a well implant 110 is performed to establish well 104. The doping level of well 104 increases from a relatively constant level in the central region 116 of well 104 to a higher level toward the edge of well 104, as shown in graph 114. The increase in doping level begins at a location designated "minimum well proximity effects" (WPE), increases nonlinearly (for example, inverse square ($1/x^2$)) to an intermediate WPE level and further to a minimum design rule distance from the edge of well 104. Design rules dictate the "minimum design rule" distance from the edge of wells 104, 107 to prevent circuits on different wells 104, 107 from interfering with one another and to comply with constraints imposed by equipment used to manufacture device 100.

The variation in doping levels of well 104 is due to the edge of photoresist 108 being at an angle with respect to the top surface of substrate 102. The angled sidewall 118 of photoresist 108 causes reflected implant ions 112 to penetrate substrate 102 at the edge of well 104 in addition to vertical implants 110 while the central region 116 is subject only to vertical implants 110.

The semiconductor substrate described herein can be any semiconductor material or combinations of materials, such as gallium arsenide, silicon germanium, silicon-on-insulator (SOI), silicon, monocrystalline silicon, the like, and combinations of the above. If well 104 is a p-well, implants 110, 112 can be performed using a suitable material such as boron. If well 104 is an n-well, implants 110, 112 can be performed using another suitable material such as phosphorus.

Device 100 is shown at an intermediate stage of manufacture. Further stages of manufacture conventionally performed can include forming a gate stack with layers of material(s) such as dielectric, polysilicon and/or metal, implanting source/drain regions, forming spacers around the gate stack, siliciding the source/drain regions and gate stack, and forming conductive contacts to the source/drain regions and gate stack, among other features.

Figure 2:
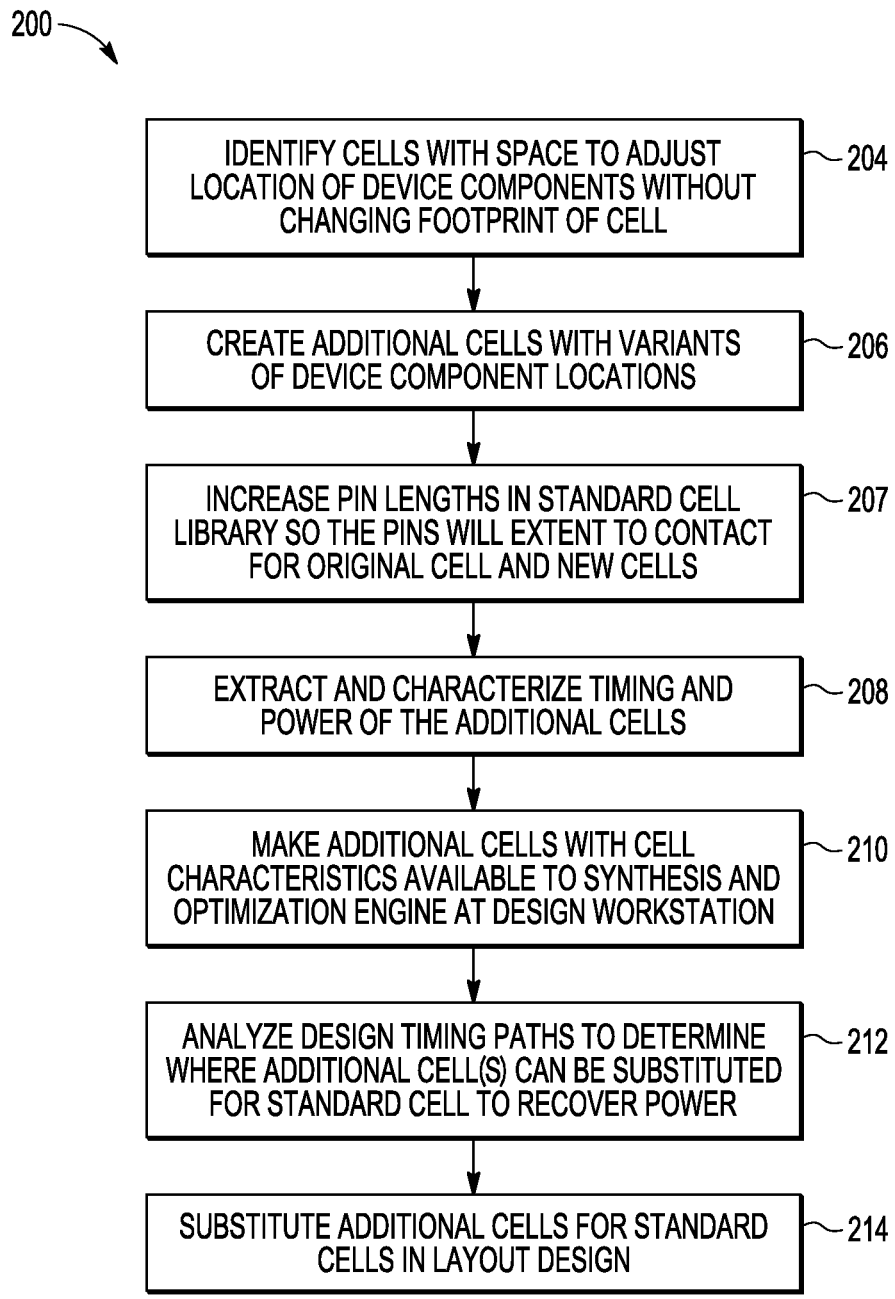
FIG. 2 illustrates a flow chart of an embodiment of a method for designing integrated circuits in accordance with the present disclosure.

FIG. 2 illustrates a flow chart of an embodiment of a method 200 for designing integrated circuits in accordance with the present disclosure. Process 204 includes identifying cells with space available to adjust the location of device components such as the well in a transistor without changing the footprint of the cell. Other criteria for identifying cells to modify can include cells that are commonly used, and cells that are typically used outside the critical timing paths. Such cells can often be substituted to change the timing of one circuit without affecting timing of other circuits. The footprint of the cell remains unchanged even when a component such as a well is relocated, again avoiding the need to change routing and again analyzing the new design to determine that timing and performance requirements are met.

Process 206 includes creating additional cells with variants of device component locations based on the standard cells with the modified pin lengths. For example, the standard cell can include the pin lengths and the edge of the well positioned at the minimum WPE distance shown in graph 114 of FIG. 1. A first variant of the standard cell can include modified pin lengths and a well with an edge positioned at the design rule minimum shown in graph 114 of FIG. 1. A second variant of the standard cell can include the modified pin lengths and the edge of the well positioned at the intermediate WPE distance shown in graph 114 of FIG. 1. Any other number of variants of the standard cell with the well positioned at other locations can be created.

Process 207 can include increasing the length of pins in standard cells for circuit components such as NMOS and PMOS transistors so that the pins will extend to contacts. The pins can be coupled to input and output source/drain regions by respective contacts. The length of the pins extends a distance over which an active area or well of a transistor can be positioned. For example, an edge of the well can be positioned anywhere between the minimum design rule distance and the minimum WPE distance shown in graph 114 of FIG. 1. The length of the pins is increased so that the location of the contacts relative to the location of the well remains the same.

Process 208 includes extracting and characterizing timing and power consumption of the standard cell variants. The timing and power consumption characteristics are used in electronic design automation (EDA) systems that aid users in designing and simulating/testing semiconductor circuits. Examples of computer-implemented EDA tools that are commercially available include Encounter and OrCAD, and PSpice suites of tools from Cadence Design Systems in San Jose, Calif.

A library containing the standard cell variants can be made available to the EDA tool in process 210 in addition to the library containing the standard cells. The location of the standard cell variant library can be specified in the EDA tool. Alternatively, the standard cell variants can be added to an existing library, where permitted.

Figure 3:
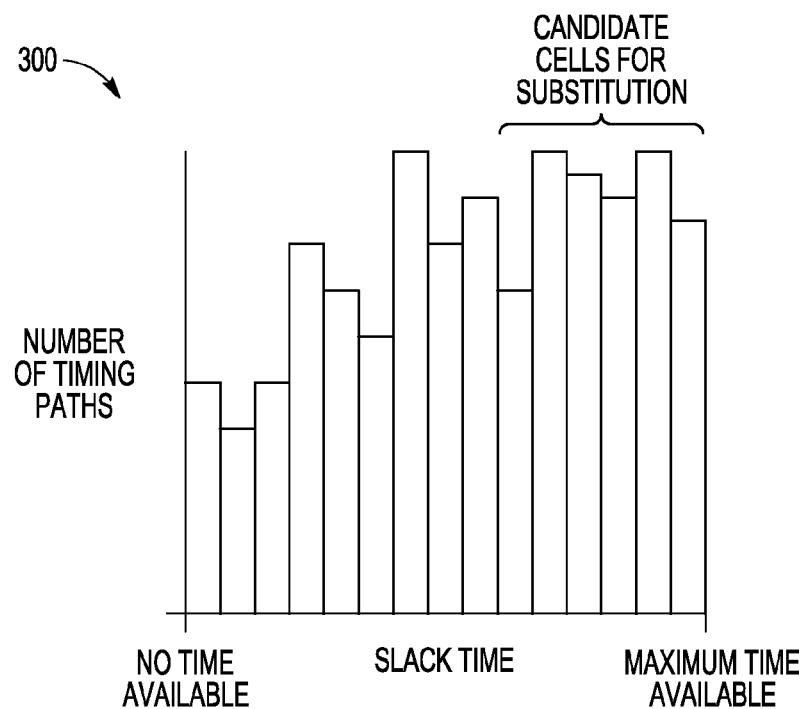
FIG. 3 illustrates an example of a graph of a number of timing paths in an integrated circuit versus the amount of available slack time for timing path.

Process 212 can include analyzing the timing paths of various circuits in the integrated circuit to determine where available timing slack for a path remains unused. As an example, FIG. 3 shows a graph of a number of timing paths in an integrated circuit on the y-axis versus time available for each path on the x-axis. The time available or unused in a path is also referred to as slack time. The timing paths having at least a specified amount of slack time can be considered as candidates for substituting standard cells for a standard cell variant. For example, timing paths that have at least 30% or other suitable threshold of slack time can be considered as candidates for substitution. One or more of the standard cell variants that respond more slowly and use less power due to lower leakage current can be substituted for the corresponding standard cells that have faster response but higher leakage current. The EDA tool can provide the designer with the timing and power consumption of timing path(s) of the circuits that include the substitute cell(s) to verify that timing and performance constraints are met.

Process 214 includes substituting one of the additional cells for a standard cell in the design layout. When a modified cell is substituted for a standard cell, the routing traces in the metal layers can remain the same since the only change in the cell is the location of the component(s) such as a transistor from a boundary of a doped well. This feature reduces the need to iterate timing and performance analysis due to the substitution of the standard cell to recover power.

Figure 4:
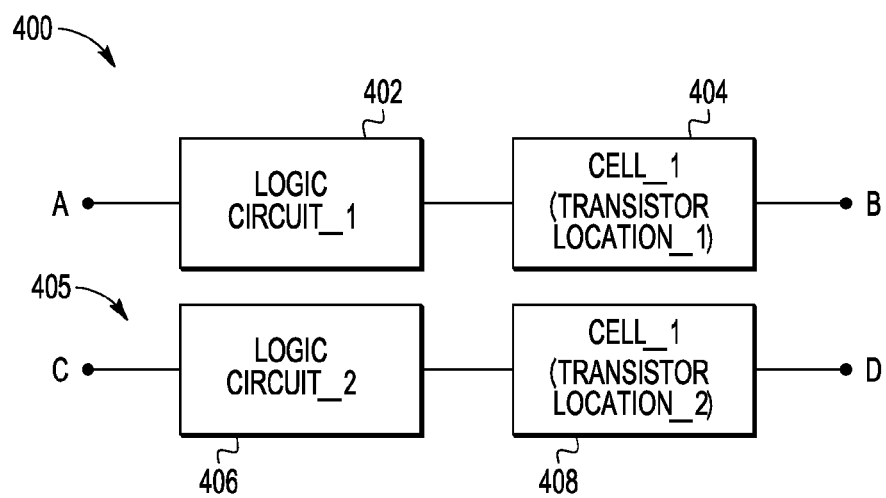
FIG. 4 illustrates a first circuit path using a first cell with a transistor at a first location and a second circuit path using the first cell with a transistor at a second location in accordance with an embodiment of the disclosure.

FIG. 4 illustrates a first circuit path 400 using a first standard cell 404 with a transistor at a first location within a standard cell boundary and a second circuit path 405 using a second standard cell 408 with a transistor at a second location within a standard cell boundary in accordance with an embodiment of the disclosure. First circuit path 400 includes a first logic circuit 402 coupled to first cell 404 to establish a first timing path between points A-B. The second circuit path 405 includes second logic circuit 406 coupled to second cell 408 to establish a second timing path between points C-D. Second standard cell 408 can be a variant of first standard cell 404, which means that second standard cell 408 can perform the same function using the same components as first standard cell 404, but some of the components of second standard cell 408 are at a different location with respect to a well boundary line compared to the components of first standard cell 404.

Figure 5:
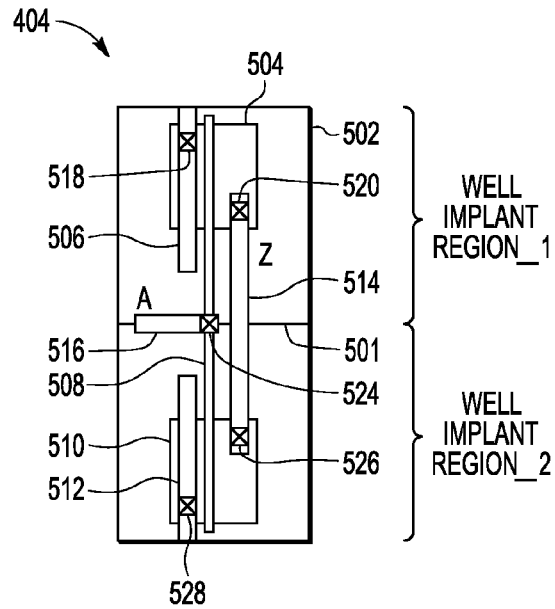
FIG. 5 illustrates an embodiment of a layout for the first cell of FIG. 4.
Figure 6:
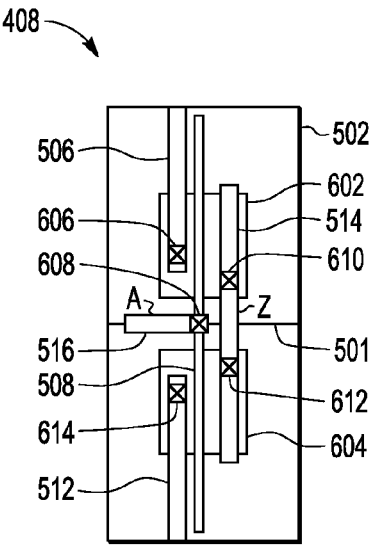
FIG. 6 illustrates an embodiment of a layout for the second cell of FIG. 4.
Figure 7:
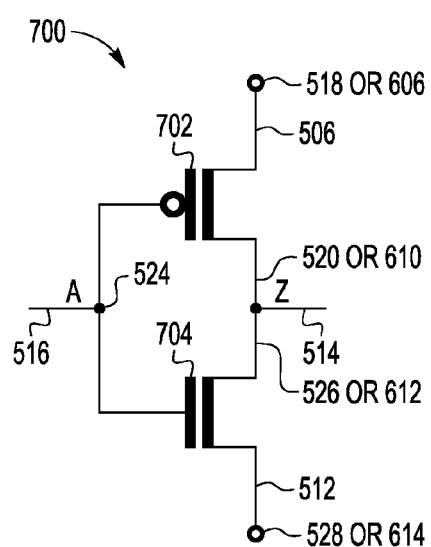
FIG. 7 illustrates a schematic diagram of an embodiment of an inverter that can be implemented using the layouts of the first cell of FIG. 5 or the second cell of FIG. 6.

Referring to FIGS. 5 through 7, FIG. 5 illustrates an embodiment of a layout for a variant of first standard cell 404 of FIG. 4 within well boundary 502. FIG. 6 illustrates an embodiment of a layout for the second cell 408 of FIG. 4 within well boundary 502. The first standard cell 404 has first and second doped well regions separated by boundary line 501. Boundary line 501 is shown bisecting well boundary 502 but may be positioned at another location that allows sufficient room for different types of devices. For example, an N-channel transistor may require less area than a P-channel transistor, and boundary line 501 may be positioned accordingly.

A first transistor is laid out in the first well implant region and includes well or active region 504, source/drain pin 506 with electrical contact 518 to a first source/drain implant region (not shown) in well 504, gate material 508 over well 504, and source/drain pin 514 with electrical contact 520 to a second source/drain implant region (not shown) in well 504. A second transistor is laid out in the second well implant region and includes well or active region 510, source/drain pin 512 with electrical contact 528 to a first source/drain implant region (not shown) in well 510, gate material 508 over well 510, and source/drain pin 514 with electrical contact 526 to a second source/drain implant region (not shown) in well 510. Pin 514 spans the distance between well 504 and well 510. An output (Z) is coupled to pin 514 between wells 504 and 510, coupling a source/drain region of the first transistor to a source/drain region of the second transistor.

Gate material 508 spans the distance between well 504 and well 510 and couples the gate of the first transistor to the gate of the second transistor. In the example shown, contact 524 is located on gate material 508 between wells 504 and 510 to couple input (A) to the gates of the transistors at pin 516. Gate material 508 can be one or more than one layer of gate material including polysilicon, metal, and/or other suitable material. The first transistor can have the opposite polarity of the second transistor. For example, the first transistor may be a P-channel transistor with an N-type well and the second transistor may be an N-channel transistor with a P-type well.

In the first standard cell 404, wells 504 and 510 are as far from each other as possible within cell boundary 502. The length of each of pins 506, 512, 514 is selected to span a distance over which wells 504, 510 may be positioned, from being as close to each other as possible within the design rules to being as far from each other within the edge of the cell boundary and the design rules. For example, FIG. 6 illustrates second standard cell 408 as a variant of first standard cell 404 of FIG. 5. A first well implant region 602 and a second well implant region 604 are closer to boundary line 501 and to each other than for wells 504, 510 of first standard cell 404.

In FIG. 6, a first transistor is laid out in the first well implant region and includes well or active region 602, source/drain pin 506 with electrical contact 606 to a first source/drain implant region (not shown) in well 602, gate material 508 over well 602, and source/drain pin 514 with electrical contact 610 to a second source/drain implant region (not shown) in well 602. A second transistor is laid out in the second well implant region and includes well or active region 604, source/drain pin 512 with electrical contact 614 to a first source/drain implant region (not shown) in well 604, gate material 508 over well 604, and source/drain pin 514 with electrical contact 612 to a second source/drain implant region (not shown) in well 604. Pin 514 spans the distance between well 602 and well 604 and overlaps a portion of wells 602 and 604 to a greater extent than in cell 404 (FIG. 5) since wells 602, 604 are closer to one another. Output (Z) of standard cell 408 is coupled to pin 514 between wells 602 and 604, coupling a source/drain region of the first transistor to a source/drain region of the second transistor. Gate material 508 spans the distance between well 602 and well 604. Contact 524 couples the gate of the first transistor to the gate of the second transistor at input (A) shown at pin 516.

Pins 506, 512, 514 have the same length and position in both FIGS. 5 and 6 and are sufficient to allow corresponding contacts 518, 520, 526, 528 of FIG. 5 and contacts 606, 610, 612, 614 of FIG. 6 to be placed where needed to achieve the desired coupling and functionality of components in cells 404 and 408.

Referring to FIGS. 5, 6, and 7, FIG. 7 illustrates a schematic diagram of an embodiment of an inverter 700 that can be implemented using the layouts of the first cell 404 of FIG. 5 or the second cell 408 of FIG. 6. Inverter 700 includes a P-channel transistor 702 with source contact 518 or 606 coupled to pin 506, gate contact 524 coupled to an input (A) at pin 516, and a drain contact 520 or 610 coupled to an output (Z) at pin 514. Inverter 700 further includes N-channel transistor 704 with drain contact 526 or 612 coupled to the output (Z) at pin 514, gate contact 524 coupled to the input (A) at pin 516, and a source contact 528 or 614 coupled to pin 512. When inverter 700 is configured according to the standard cell 404 of FIG. 5, the transistors 702, 704 will have fast performance but relatively high power consumption due to leakage current compared to the standard cell 408 of FIG. 6. Providing variants of standard cells thus gives designers additional capability to reduce power consumption while remaining within timing constraints by replacing standard cells with a corresponding variant. Significant power recovery may be realized even if variants are provided for only the most commonly used standard cells.

By now it should be appreciated that, in some embodiments, a method of making a first timing path (406, 408) can comprise developing a first design of the first timing path with a first logic circuit (406) and a first functional cell (408, 500). The first functional cell can comprise a first transistor (704) that is spaced from a first well boundary (501). The first timing path can be analyzed (212) to determine if the first timing path has positive timing slack. If the analyzed speed of operation shows positive timing slack, the design (214) can be changed to a modified design to reduce leakage power consumption of the first timing path by moving the first transistor closer to the first well boundary. The first timing path can be built using the modified design (600) to reduce leakage power consumption of the first timing path by reducing power consumption of the first transistor.

In another aspect, developing the first design can be further characterized by the first functional cell further comprising a second transistor (702) of a type opposite that of the first transistor.

In another aspect, developing the first design can be further characterized by the second transistor being in a second well (below 501) and spaced from a second well boundary (501) to reduce leakage current.

In another aspect, the changing the design to the modified design can be further characterized by moving the second transistor closer to the second well boundary.

In another aspect, the first design can be of an inverter.

In another aspect, changing the design can further comprise developing a plurality of alternative designs (206) with a plurality of distances of the first transistor from the first well boundary and selecting one of the alternative designs that provides for a least amount of positive timing slack for the modified design in order to reduce leakage current while maintaining sufficient speed.

In another aspect, the alternative designs can comprise a plurality of locations with the plurality of distances from the well boundary.

In another aspect, the first design can have an overlying metal interconnect layer configuration and a pin configuration over the overlying metal interconnect layer configuration. The alternative designs can have the overlying interconnect configuration and the pin configuration of the first design to allow swapping cells while using existing routing.

In another aspect, the first design can have the first transistor in a first active region (504) and the modified design can have the first transistor in a second active region (510) closer to the well boundary.

In another aspect, the first design can be one of a plurality of designs for a standard cell library.

In other embodiments, an integrated circuit can comprise a first circuit having a first logic circuit (402) coupled to a first cell (404) of a first design (500) to establish a first timing path (A-B). The first cell has a first transistor (704) spaced from a boundary of a first well. A second circuit can have a second logic circuit (406) coupled to a second cell (600) of the first design. The second cell is slower than the first cell and has a second well analogous to the first well. The second well has a boundary (501 FIG. 6) analogous in location to the boundary of the first well, and the second cell is closer to the boundary of the second well than the first cell is to the boundary of the first well.

In another aspect, the first and second circuits have substantially no positive timing slack.

In another aspect, the second circuit would have positive timing slack if the second cell was replaced by the first cell.

In another aspect, the first cell can have a first plurality of transistors (702, 704) and the second cell has a second plurality of transistors (702, 704). Each transistor of the first plurality of transistors can have a corresponding transistor of the second plurality of the same size.

In another aspect, the first cell can comprise a first inverter and the second cell comprises a second inverter.

In another aspect, the second cell can have less leakage than the first cell.

In another aspect, the second cell can have a first N channel transistor and the second cell has a second N channel transistor with a higher threshold voltage than the first N channel transistor.

In further embodiments, a method of making a first timing path can comprise analyzing a first design (500) for the first timing path (406, 408) to determine if the first design results in positive timing slack. If the first design has positive timing slack, the first design can be altered to a second design (600) to obtain substantially no positive timing slack for the first timing path by changing a location of a first transistor (704) of the first design to a location closer to a first well boundary (501) before manufacturing the second design (408).

In another aspect, altering the first design can comprise defining a plurality of designs (204-212) with the transistor in varying proximities to the well boundary, analyzing the plurality of designs for positive timing slack, and selecting (214) a design of the plurality of designs that provides for a minimum positive timing slack for use in the second design.

In another aspect, the method can further comprise forming a plurality of timing paths using a plurality of different standard cells, obtaining a library of adjusted standard cells (204-210) by identifying a plurality of adjustable standard cells of the different standard cells that have transistors moved in relation to well boundaries to achieve different speeds, and selecting replacements among the adjusted standard cells (212) for the different standard cells to reduce positive timing slack and thereby reduce current leakage.

Because the apparatus implementing the present disclosure is, for the most part, composed of electronic components and circuits known to those skilled in the art, circuit details will not be explained in any greater extent than that considered necessary as illustrated above, for the understanding and appreciation of the underlying concepts of the present disclosure and in order not to obfuscate or distract from the teachings of the present disclosure.

Although the disclosure has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, method 200 of FIG. 2 can be implemented using a computer system such as an integrated circuit design workstation with EDA tools. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of making a first timing path, comprising:
developing a first design of the first timing path with a first logic circuit and a first functional cell, wherein the first functional cell comprises a first transistor that is spaced from a first well boundary;
analyzing the first timing path to determine if the first timing path has positive timing slack; and
if the analyzed speed of operation shows positive timing slack:
changing the design to a modified design to reduce leakage power consumption of the first timing path by moving the first transistor closer to the first well boundary; and
building the first timing path using the modified design to reduce leakage power consumption of the first timing path by reducing power consumption of the first transistor.

2. The method of claim 1, wherein the developing the first design is further characterized by the first functional cell further comprising a second transistor of a type opposite that of the first transistor.

3. The method of claim 2, wherein the developing the first design is further characterized by the second transistor being in a second well and spaced from a second well boundary to reduce leakage current.

4. The method of claim 3, wherein the changing the design to the modified design is further characterized by moving the second transistor closer to the second well boundary.

5. The method of claim 4, wherein the first design is of an inverter.

6. The method of claim 1, wherein changing the design further comprises developing a plurality of alternative designs with a plurality of distances of the first transistor from the first well boundary and selecting one of the alternative designs that provides for a least amount of positive timing slack for the modified design in order to reduce leakage current while maintaining sufficient speed.

7. The method of claim 5, wherein the alternative designs comprise a plurality of locations with the plurality of distances from the well boundary.

8. The method of claim 6, wherein the first design has an overlying metal interconnect layer configuration and a pin configuration over the overlying metal interconnect layer configuration, wherein the alternative designs have the overlying interconnect configuration and the pin configuration of the first design to allow swapping cells while using existing routing.

9. The method of claim 8, wherein the first design has the first transistor in a first active region and the modified design has the first transistor in a second active region closer to the well boundary.

10. The method of claim 1 wherein the first design is one of a plurality of designs for a standard cell library.

11. An integrated circuit, comprising:
a first circuit having a first logic circuit coupled to a first cell of a first design to establish a first timing path, wherein the first cell has a first transistor spaced from a boundary of a first well;
a second circuit having a second logic circuit coupled to a second cell of the first design; wherein the second cell is slower than the first cell;
the second cell has a second well analogous to the first well;
the second well has a boundary analogous in location to the boundary of the first well; and
the second cell is closer to the boundary of the second well than the first cell is to the boundary of the first well.

12. The integrated circuit of claim 11, wherein the first and second circuits have substantially no positive timing slack.

13. The integrated circuit of claim 12, wherein the second circuit would have positive timing slack if the second cell was replaced by the first cell.

14. The integrated circuit of claim 13, wherein the first cell has a first plurality of transistors and the second cell has a second plurality of transistors, wherein each transistor of the first plurality of transistors has a corresponding transistor of the second plurality of the same size.

15. The integrated circuit of claim 11, wherein the first cell comprises a first inverter and the second cell comprises a second inverter.

16. The integrated circuit of claim 11, wherein the second cell has less leakage than the first cell.

17. The method of claim 11, wherein the second cell has a first N channel transistor and the second cell has a second N channel transistor with a higher threshold voltage than the first N channel transistor.

18. A method of making a first timing path, comprising:
analyzing a first design for the first timing path to determine if the first design results in positive timing slack; and
if the first design has positive timing slack:
altering the first design to a second design to obtain substantially no positive timing slack for the first timing path by changing a location of a first transistor of the first design to a location closer to a first well boundary; and
manufacturing the second design.

19. The method of claim 18, wherein the altering the first design comprises:
defining a plurality of designs with the transistor in varying proximities to the well boundary;
analyzing the plurality of designs for positive timing slack;
selecting a design of the plurality of designs that provides for a minimum positive timing slack for use in the second design.

20. The method of claim 19, further comprising:
forming a plurality of timing paths using a plurality of different standard cells;
obtaining a library of adjusted standard cells by identifying a plurality of adjustable standard cells of the different standard cells that have transistors moved in relation to well boundaries to achieve different speeds; and
selecting replacements among the adjusted standard cells for the different standard cells to reduce positive timing slack and thereby reduce current leakage.

* * * * *